(12) United States Patent
Yamamoto (10) Patent No.: US 12,085,008 B2
(45) Date of Patent: Sep. 10, 2024

(54) COOLING MECHANISM

(71) Applicant: ISUZU MOTORS LIMITED, Tokyo (JP)

(72) Inventor: Kazunari Yamamoto, Fujisawa (JP)

(73) Assignee: ISUZU MOTORS LIMITED, Tokyo (JP)

( * ) Notice: Subject to any disclaimer, the term of this patent is extended or adjusted under 35 U.S.C. 154(b) by 0 days.

(21) Appl. No.: 18/546,495

(22) PCT Filed: Mar. 8, 2022

(86) PCT No.: PCT/JP2022/009852
§ 371 (c)(1),
(2) Date: Aug. 15, 2023

(87) PCT Pub. No.: WO2022/191159
PCT Pub. Date: Sep. 15, 2022

(65) Prior Publication Data
US 2024/0093629 A1     Mar. 21, 2024

(30) Foreign Application Priority Data
Mar. 8, 2021 (JP) .................. 2021-035993

(51) Int. Cl.
*F01P 3/12* (2006.01)
*F01P 7/16* (2006.01)
(Continued)

(52) U.S. Cl.
CPC .................. *F01P 3/12* (2013.01); *F01P 7/16* (2013.01); *F02B 29/0437* (2013.01); *F02B 37/24* (2013.01)

(58) Field of Classification Search
CPC ........... F01P 3/12; F01P 7/16; F02B 29/0437; F02B 37/24
See application file for complete search history.

(56) References Cited

U.S. PATENT DOCUMENTS

2015/0300202 A1    10/2015    Maeda

FOREIGN PATENT DOCUMENTS

JP         2011-256832 A    12/2011
JP         2013-002307 A     1/2013
(Continued)

OTHER PUBLICATIONS

Machine Translation of JP2019183751A PDF File Name: "JP2019183751A_Machine_Translation.pdf".*

(Continued)

*Primary Examiner* — Grant Moubry
*Assistant Examiner* — Ruben Picon-Feliciano
(74) *Attorney, Agent, or Firm* — PROCOPIO, CORY, HARGREAVES & SAVITCH LLP (57) ABSTRACT

A cooling mechanism 10 includes: a cooling circuit 11; and a compressor cooling path 30 branched from the cooling circuit 11 and joined to the cooling circuit 11 after passing through an inside of a compressor 22. The cooling mechanism 10 includes a flow rate adjustment valve 32 configured to control a flow rate of cooling water flowing inside the compressor 22. The flow rate adjustment valve 32 is configured to make the flow rate of the cooling water flowing inside the compressor 22 when a temperature of intake air at an outlet of the compressor 22 is lower than a temperature of the cooling water lower than the flow rate of the cooling water flowing inside the compressor 22 when the temperature of the intake air at the outlet of the compressor 22 becomes equal to or higher than the temperature of the cooling water.

5 Claims, 4 Drawing Sheets

(51) Int. Cl.
    *F02B 29/04*     (2006.01)
    *F02B 37/24*     (2006.01)

(56)     References Cited

FOREIGN PATENT DOCUMENTS

| JP | 2014-129724 A | | 7/2014 |
|---|---|---|---|
| JP | 2017-218997 A | | 12/2017 |
| JP | 2019183751 A | * | 10/2019 |
| JP | 2020-128724 A | | 8/2020 |

OTHER PUBLICATIONS

Patent Cooperation Treaty, International Search Report, Application No. PCT/JP2022/009852, dated May 24, 2022, in 5 pages.
Patent Cooperation Treaty, WOSA, Application No. PCT/JP2022/009852, dated May 24, 2022, in 4 pages.

* cited by examiner

COOLING MECHANISM

CROSS-REFERENCE TO RELATED APPLICATIONS

This application is US National Stage of International Patent Application PCT/JP2022/009852, filed Mar. 8, 2022, which claims benefit of priority from Japanese Patent Application JP2021-035993, filed Mar. 8, 2021, the contents of both of which are incorporated herein by reference.

TECHNICAL FIELD

The present disclosure relates to a cooling mechanism, and more particularly to a cooling mechanism for cooling a compressor with cooling water of an internal combustion engine.

BACKGROUND ART

A cooling mechanism for cooling a compressor with cooling water for an internal combustion engine has been proposed (for example, see Patent Literature 1). If the temperature of intake air after passing through a compressor is lower than a threshold and the temperature of cooling water is higher than the temperature of the intake air, the invention described in Patent Literature 1 makes the flow rate of the cooling water larger than that when the temperature of the cooling water is equal to or lower than the temperature of the intake air. That is, an object of the invention described in Patent Literature 1 is to raise the temperature of the intake air by the cooling water.

CITATION LIST

Patent Literature

Patent Literature 1: JP2017-218997A

SUMMARY OF INVENTION

Technical Problem

However, in a configuration in which a supercharger is to be cooled by cooling water as in the cooling mechanism described in Patent Literature 1, the temperature of the intake air may rise due to the cooling water, which expands the volume of the intake air. Such an expansion of the volume of the intake air reduces the amount of air introduced into the cylinder and thus leads to deterioration in the combustion and the fuel efficiency. Therefore, in the cooling mechanism described in Patent Literature 1, the fuel efficiency deteriorates when the temperature of the intake air after passing through the compressor is lower than the threshold.

An object of the present disclosure is to provide a cooling mechanism that prevents deterioration of the fuel efficiency in a structure in which a compressor is cooled by cooling water of an internal combustion engine.

Solution to Problem

A cooling mechanism according to an aspect of the present disclosure for achieving the above object includes: a cooling circuit of an internal combustion engine; and a compressor cooling path branched from the cooling circuit and joined to the cooling circuit after passing through an inside of a compressor that supercharges intake air of the internal combustion engine. The compressor is configured to be driven in a manner interlocked with a turbine driven by exhaust gas. The cooling mechanism includes a flow rate adjustment valve configured to control a flow rate of cooling water flowing inside the compressor. The flow rate adjustment valve is configured to make the flow rate of the cooling water flowing inside the compressor when a temperature of intake air at an outlet of the compressor is lower than a temperature of the cooling water lower than the flow rate of the cooling water flowing inside the compressor when the temperature of the intake air at the outlet of the compressor becomes equal to or higher than the temperature of the cooling water.

Advantageous Effects of Invention

According to the aspect of the present disclosure, by reducing the flow rate of the cooling water flowing through the inside of the compressor when the temperature of the intake air at the outlet of the compressor is lower than the temperature of the cooling water, it is possible to prevent the volume of the intake air from expanding as the temperature of the intake air rises due to the cooling water. This is advantageous for ensuring the amount of air introduced into the cylinder, and can avoid deterioration of the fuel efficiency.

DESCRIPTION OF EMBODIMENTS

Figure 1:
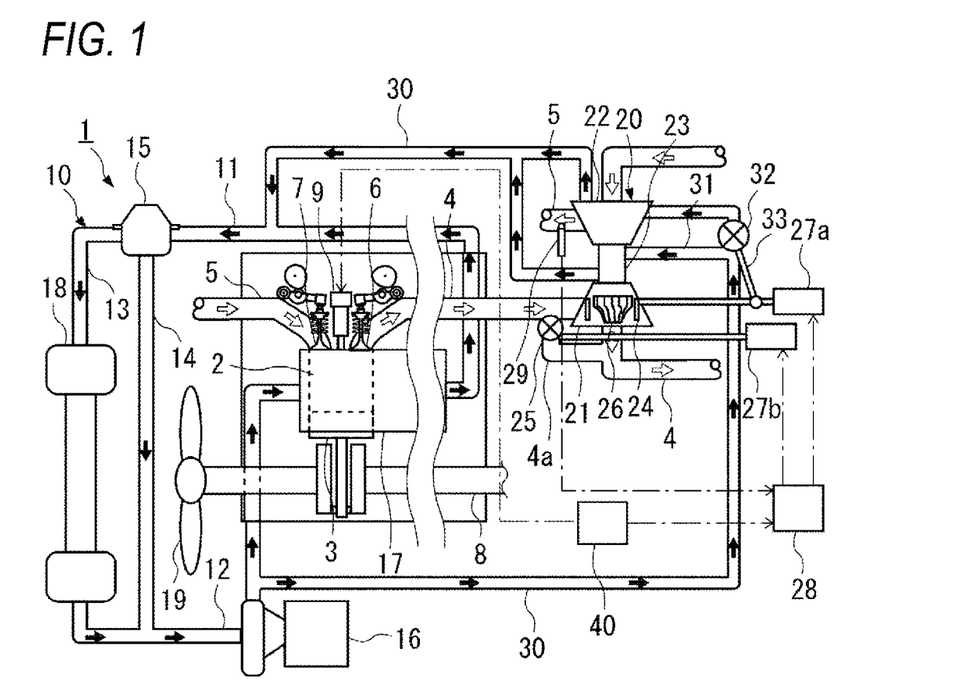
FIG. 1 is a configuration diagram illustrating a cooling mechanism according to a first embodiment.
Figure 5:
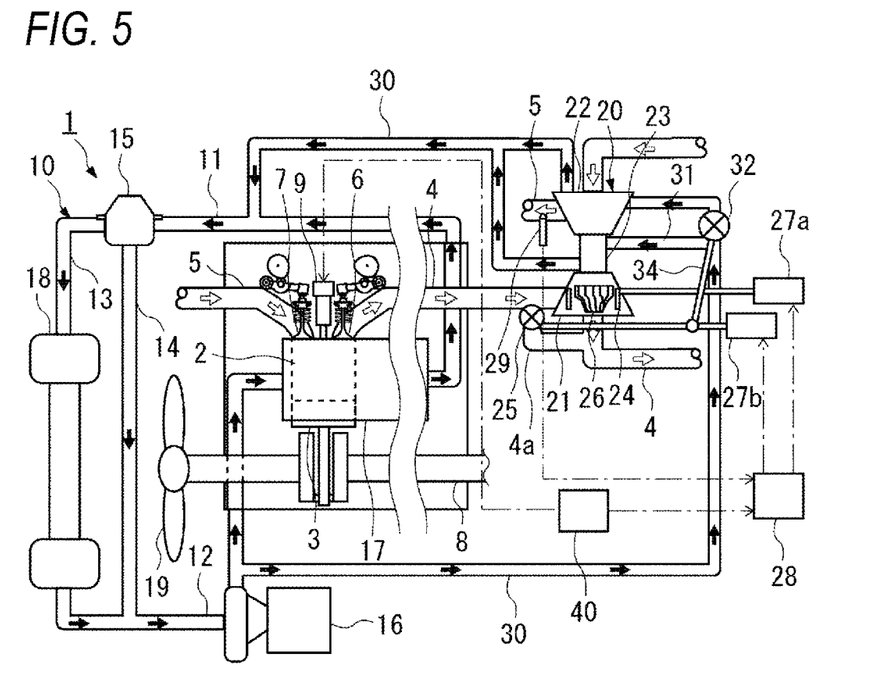
FIG. 5 is a configuration diagram illustrating a cooling mechanism according to a second embodiment.
Figure 8:
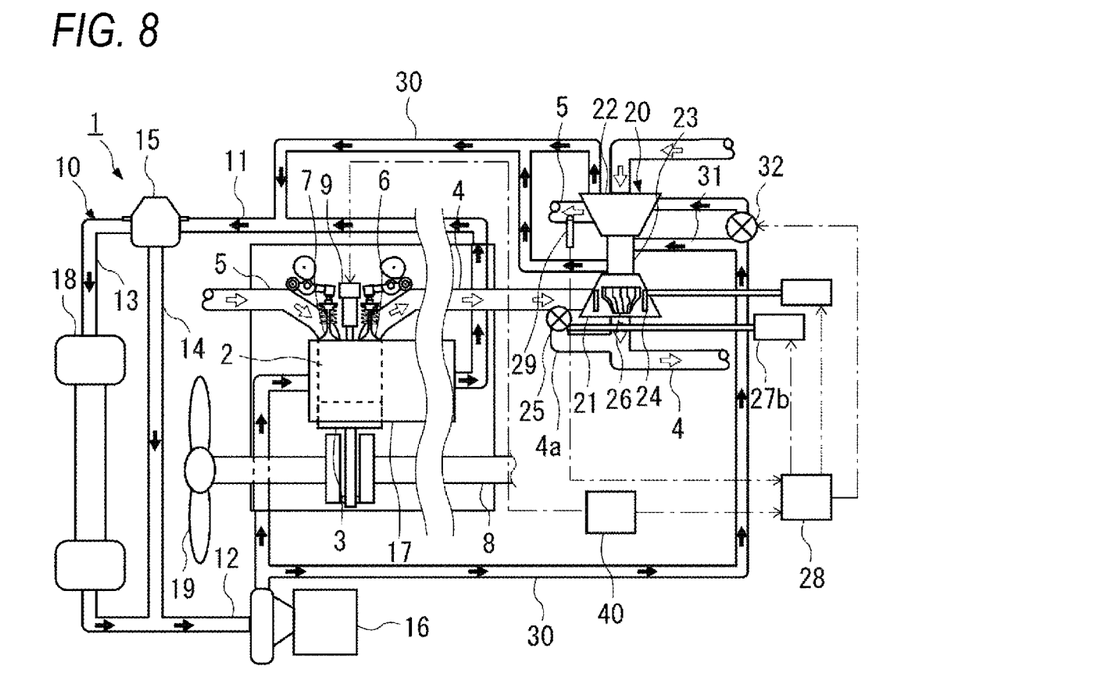
FIG. 8 is a configuration diagram illustrating a cooling mechanism according to a third embodiment.

Hereinafter, an embodiment of a cooling mechanism internal combustion engine disclosed herein will be described. In FIGS. 1, 5, and 8, a one-dot chain line indicates a signal line, a white arrow indicates the flow of gas (intake air or exhaust air), and a filled arrow indicates the flow of cooling water. In the drawings, the arrangement of the flow paths of the cooling water and the gas is changed for easy understanding of the configuration, and is not necessarily the same as that actually manufactured. In order to avoid complication of the drawings, only one cylinder 2 is illustrated.

As illustrated in FIG. 1, a cooling mechanism 10 of the first embodiment is a mechanism for cooling an internal combustion engine 1, which is a diesel engine using light oil as fuel. The internal combustion engine 1 is an engine for obtaining power from a reciprocating linear motion of a piston 3 inside a cylinder 2, and includes a turbocharger 20. The internal combustion engine 1 is a multi-cylinder engine having not only one cylinder but also other cylinders (not illustrated). The fuel of the internal combustion engine 1 is not limited to light oil, and may be gasoline or liquefied gas. The number of cylinders and the arrangement of the cylinders in the internal combustion engine 1 are not particularly limited.

The turbocharger 20 includes a turbine 21 disposed in an exhaust path 4, a compressor 22 disposed in an intake path 5, and a bearing 23 that supports a rotating shaft that interlocks the turbine 21 and the compressor 22. The turbocharger 20 is configured such that the exhaust gas discharged from the exhaust valve 6 to the exhaust path 4 rotates the turbine 21, the rotational power of the turbine 21 drives the compressor 22 to rotate, and the compressor 22 supercharges the intake air introduced into the cylinder 2 from the intake valve 7.

The turbine 21 has variable blades 24 and a wastegate valve 25. The turbine 21 is configured to change the opening area of the exhaust flow path of the turbine housing by the variable blades 24, thereby adjusting the flow velocity of the exhaust gas flowing through the exhaust flow path and adjusting the rotation of turbine blades 26. The turbine 21 is configured such that the wastegate valve 25 changes the flow rate of the exhaust gas flowing into the turbine housing, thereby adjusting the rotation of the turbine blades 26.

The compressor 22 rotates in a manner interlocked with the rotation of the turbine blades 26. The compressor 22 is a water-cooled compressor cooled by cooling water of the cooling mechanism 10 to be described later. The bearing 23 supports the rotating shaft of the turbine 21 and the compressor 22. Similarly to the compressor 22, the bearing 23 is also a water-cooled bearing cooled by the cooling water of the cooling mechanism 10 to be described later.

The variable blades 24 are disposed in the exhaust flow path inside the turbine housing and is driven by a drive device 27a. When a pressure Px of the intake air at the outlet of the compressor 22 is lower than a desired target pressure, the variable blades 24 are closed to the fully closed side by the drive device 27a to reduce the opening area of the exhaust flow path. When the pressure Px is higher than the target pressure, the variable blades 24 are opened to the fully open side by the drive device 27a to increase the opening area of the exhaust flow path.

The wastegate valve 25 is disposed in the turbine bypass path 4a bypassing the turbine 21, and is driven by the drive device 27b. When the pressure Px of the intake air at the outlet of the compressor 22 is lower than the desired target pressure, the wastegate valve 25 is closed to the fully closed side by the drive device 27b to increase the flow rate of the exhaust gas flowing into the turbine 21. When the pressure Px of the intake air at the outlet of the compressor 22 is higher than the target pressure, the wastegate valve 25 is opened to the fully open side by the drive device 27b to reduce the flow rate of the exhaust gas flowing into the turbine 21. The wastegate valve 25 is exemplified by an internal type installed inside the turbine 21 and an external type installed outside as in the present embodiment.

In the present disclosure, the desired target pressure refers to a value calculated by the injection control device 40 based on the rotation speed of a crankshaft 8 of the internal combustion engine 1 and the depression amount of an accelerator pedal (not illustrated). The fully closed side is relative to fully open, and the fully open side is relative to fully closed. That is, an opening degree on the fully closed side from fully open indicates an opening degree other than fully open, and an opening degree to the fully open side from fully closed indicates an opening degree other than fully closed.

The drive devices 27a and 27b are both electrically connected to the control device 28, and the driving thereof is controlled by the control device 28 based on the pressure Px acquired by the pressure sensor 29 as a pressure acquiring device. Examples of the drive devices 27a and 27b include an electric actuator, a hydraulic actuator, or a pneumatic actuator, and are not particularly limited as long as the drive devices 27a and 27b can drive the variable blades 24 and the wastegate valve 25.

The control device 28 is hardware including a central processing unit (CPU) for performing various information processing, an internal storage device capable of reading and writing programs used for performing the various information processing and information processing results, and various interfaces. The control device 28 is electrically connected to the drive devices 27a and 27b, the pressure sensor 29, and an injection control device 40 that controls the fuel injection device 9.

The control device 28 has a functional element that controls driving of the variable blades 24 and the wastegate valve 25 based on the exhaust state, the target pressure of the internal combustion engine 1 obtained from the injection control device 40, and the pressure Px acquired by the pressure sensor 29. The functional elements are stored in the internal storage device as programs, and are executed by the central processing unit as appropriate. Rather than programs, the functional elements may be configured with a programmable controller (PLC) or an electric circuit that independently functions.

In the present disclosure, the exhaust state of the internal combustion engine 1 depends on the volume flow rate of the exhaust gas discharged from the exhaust valve 6 to the exhaust path 4, and is divided into a small flow rate state in which the volume flow rate of the exhaust gas is small and a large flow rate state in which the volume flow rate of the exhaust gas is large. The classification between the small flow rate state and the large flow rate state can be set freely based on the volume flow rate of the exhaust gas obtained in advance by experiments, tests, or simulations.

Figure 2:
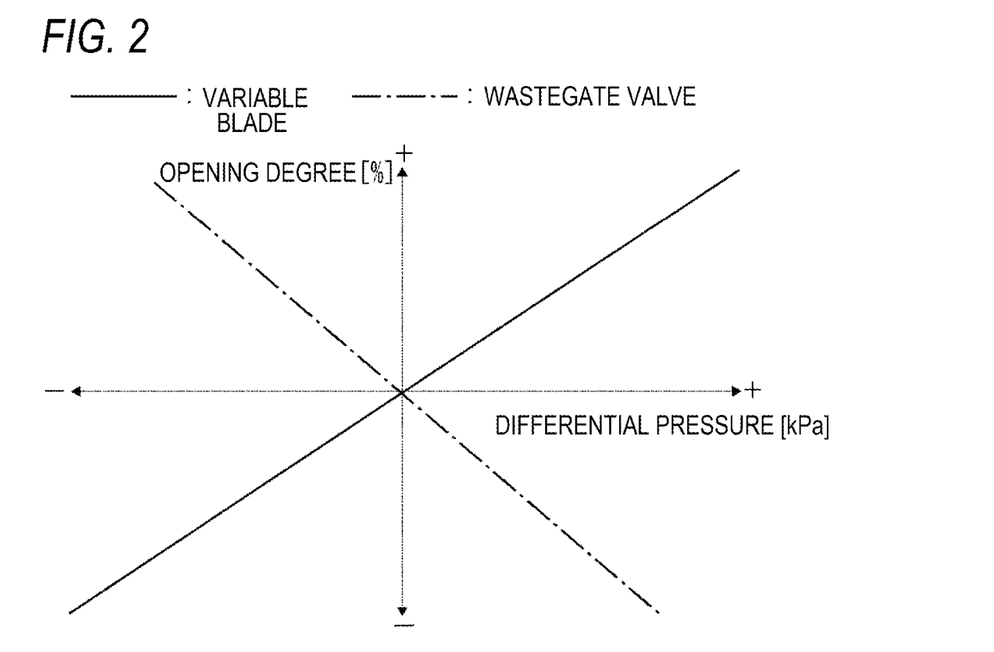
FIG. 2 is a correlation diagram illustrating a correlation between the differential pressure of the target pressure and the actual pressure of intake air at the outlet of a compressor in FIG. 1 and control values of the opening degrees of a variable blade and a wastegate valve.

As illustrated in FIG. 2, a control value indicating an increase or a reduction with respect to the current opening degree of the variable blades 24 has a positive correlation with a differential pressure ΔP, and a control value indicating an increase or a reduction with respect to the current opening degree of the wastegate valve 25 has a negative correlation with the differential pressure ΔP. When the operation state of the internal combustion engine 1 is the small flow rate state, the control device 28 fully closes the wastegate valve 25 and adjusts the opening degree of the variable blades 24 according to the control values based on the differential pressure ΔP obtained by subtracting the pressure Px from the target pressure. When the operation state of the internal combustion engine 1 is the large flow rate state, the control device 28 fully opens the variable blades 24 and adjusts the opening degree of the wastegate valve 25 according to the control values based on the differential pressure ΔP obtained by subtracting the pressure Px from the target pressure. In the present disclosure, the opening degree is positive when opened to the fully open side, negative when closed to the fully closed side, 100% when fully open, and 0% when fully closed.

As illustrated in FIG. 1, the cooling mechanism 10 is a mechanism for cooling the internal combustion engine 1 by cooling water, and includes a cooling circuit 11, a compressor cooling path 30, a bearing cooling path 31, and a flow rate adjustment valve 32. The cooling circuit 11 is a circulation circuit including a shared path 12, a cooling path 13, a bypass path 14, and a thermostat 15. The shared path 12 is provided with a cooling water pump 16 and a water jacket 17. The cooling path 13 is provided with a radiator 18. The cooling mechanism 10 is configured such that the cooling water passes through the shared path 12, then flows through at least one of the cooling path 13 and the bypass path 14 via the thermostat 15, and circulates to the shared path 12 again.

The cooling water pump 16 discharges the cooling water to circulate the cooling water. Examples of the cooling water pump 16 include an electric water pump and a mechanical water pump coupled to the crankshaft 8 by a power transmission mechanism. The water jacket 17 is a path for cooling water provided around the cylinders 2. The path is formed to surround the plurality of cylinders 2.

The thermostat 15 is disposed at a branch point of the cooling path 13 and the bypass path 14. The thermostat 15 includes a lifter (not illustrated) that expands and contracts by a thermal expansion body having the property of expanding with a temperature rise of the cooling water and contracting with a temperature fall of the cooling water. The thermostat 15 may have any configuration that can adjust the flow rate of the cooling water flowing through the cooling path 13 and the bypass path 14 according to the temperature of the cooling water, and may be configured with a three-way valve having a controllable opening degree.

The radiator 18 is arranged on the front side of the vehicle (left side in FIG. 1) where the internal combustion engine 1 is mounted, and has a cooling fan 19 disposed behind. The radiator 18 is a heat exchanger for cooling the cooling water passing inside using the vehicle speed air and the cooling air from the subsequent cooling fan 19. The cooling path 13 has a radiator 18 provided at an intermediate position therein, so that the cooling water is cooled by the radiator 18. The bypass path 14 is a flow path that bypasses the cooling path 13 so that the cooling water is not cooled by the radiator 18.

The compressor cooling path 30 branches from the cooling circuit 11, passes through the inside of the compressor 22, and then joins the cooling circuit 11. The compressor cooling path 30 of the present embodiment branches from the shared path 12 downstream of the cooling water pump 16 and upstream of the water jacket 17 in relation to the flow of the cooling water, and joins the shared path 12 downstream of the water jacket 17. The compressor cooling path 30 may branch from the shared path 12 downstream of the water jacket 17 in relation to the flow of the cooling water, and join the shared path 12 downstream of the branch point from the shared path 12.

The bearing cooling path 31 is a path that branches from the compressor cooling path 30 upstream of the compressor 22 in relation to the flow of the cooling water in the compressor cooling path 30, passes through the inside of the bearing 23, and joins the compressor cooling path 30 downstream of the compressor 22.

The flow rate adjustment valve 32 is a device for controlling the flow rate of the cooling water flowing inside the compressor 22. The flow rate adjustment valve 32 is arranged in the compressor cooling path 30 upstream of the compressor 22 and downstream of the bearing cooling path 31 in relation to the flow of the cooling water. The flow rate adjustment valve 32 is configured with a valve whose opening degree can be adjusted freely, and is capable of expanding and contracting the flow area of the compressor cooling path 30. Examples of the flow rate adjustment valve 32 include a globe valve, a gate valve, and a butterfly valve. The flow rate adjustment valve 32 is mechanically coupled to the drive device 27a for driving the variable blades 24 via a link member 33, and is driven in a manner interlocked with the driving of the drive device 27a.

Figure 3:
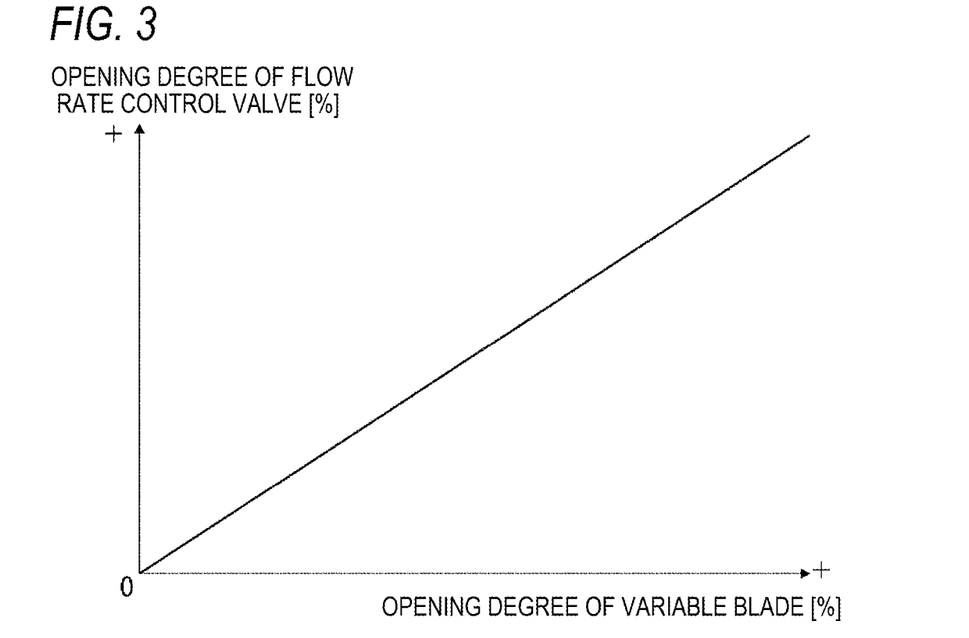
FIG. 3 is a correlation diagram illustrating a correlation between the opening degree of the variable blade and the opening degree of the flow rate adjustment valve in FIG. 1.

As illustrated in FIG. 3, the opening degree of the flow rate adjustment valve 32 has a positive correlation with the opening degree of the variable blades 24. The opening degree of the flow rate adjustment valve 32 is fully open when the opening degree of the variable blades 24 is fully open, and is fully closed when the opening degree of the variable blades 24 is fully closed.

Figure 4:
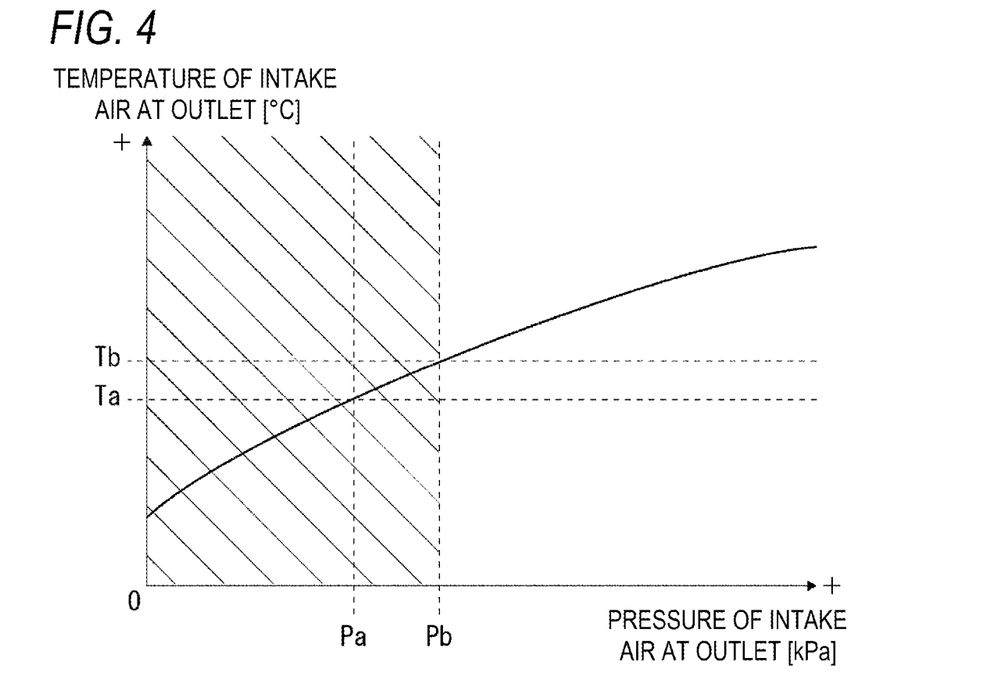
FIG. 4 is a correlation diagram illustrating a correlation between the pressure and the temperature of the intake air at the outlet of the compressor in FIG. 1.

As illustrated in FIG. 4, there is a positive correlation between the pressure Px and the temperature Tx of the intake air at the outlet of the compressor 22. The temperature Tx increases as the pressure Px of the intake air increases. The lower limit temperature Ta and the upper limit temperature Tb indicate the lower limit and the upper limit of the displacement of the temperature of the cooling water flowing through the cooling circuit 11, the compressor cooling path 30, and the bearing cooling path 31, except when the operating state of the internal combustion engine 1 is the cold state. A lower limit pressure Pa corresponds to the lower limit temperature Ta, and an upper limit pressure Pb corresponds to the upper limit temperature Tb. The shaded portion in the drawing indicates that the operation state of the internal combustion engine 1 is the small flow rate state. In FIG. 4, it is assumed that the variable blades 24 are fully open and the wastegate valve 25 is fully closed. The cold state indicates a state in which the temperature of the components of the internal combustion engine 1 is equal to the ambient temperature or lower than the ambient temperature.

When the operation state of the internal combustion engine 1 is the small flow rate state, the control device 28 fully closes the wastegate valve 25 and adjusts the opening degree of the variable blades 24 according to the control values based on the differential pressure ΔP. If the target pressure is set to the upper limit pressure Pb, the variable blades 24 come to an opening degree closed to the fully closed side from fully open until the pressure Px of the intake air at the outlet of the compressor 22 reaches the upper limit pressure Pb, and is fully open when the pressure Px of the intake air reaches the upper limit pressure Pb.

The flow rate adjustment valve 32 is interlocked with the movement of the variable blades 24, and comes to an opening degree closed to the fully closed side from fully open until the pressure Px of the intake air reaches the upper limit pressure Pb, and is fully open when the pressure Px of the intake air reaches the upper limit pressure Pb. Accordingly, the flow rate of the cooling water flowing inside the compressor 22 reduces when the temperature Tx of the intake air at the outlet of the compressor 22 is lower than the upper limit temperature Tb of the cooling water.

As illustrated in FIG. 5, the cooling mechanism 10 of the second embodiment is different from that of the first embodiment in that the flow rate adjustment valve 32 is mechanically coupled to the drive device 27b for driving the wastegate valve 25 via the link member 34 and is driven in a manner interlocked with the driving of the drive device 27b.

Figure 6:
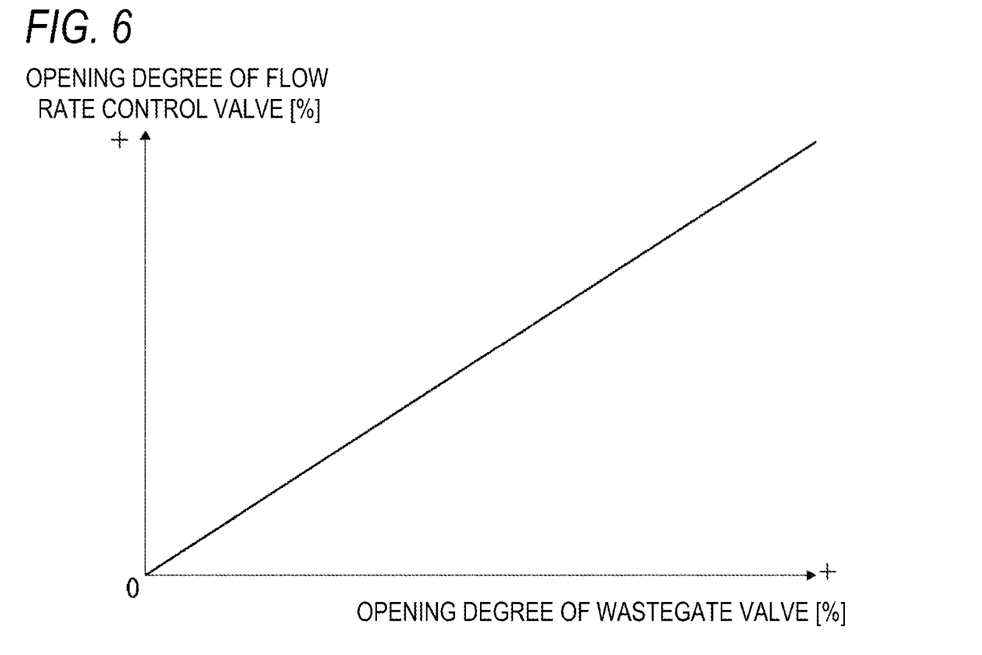
FIG. 6 is a correlation diagram illustrating a correlation between the opening degree of the wastegate valve and the opening degree of the flow rate adjustment valve in FIG. 5.

As illustrated in FIG. 6, the opening degree of the flow rate adjustment valve 32 has a positive correlation with the opening degree of the wastegate valve 25. The opening degree of the flow rate adjustment valve 32 is fully open when the opening degree of the wastegate valve 25 is fully open, and is fully closed when the opening degree of the wastegate valve 25 is fully closed.

Figure 7:
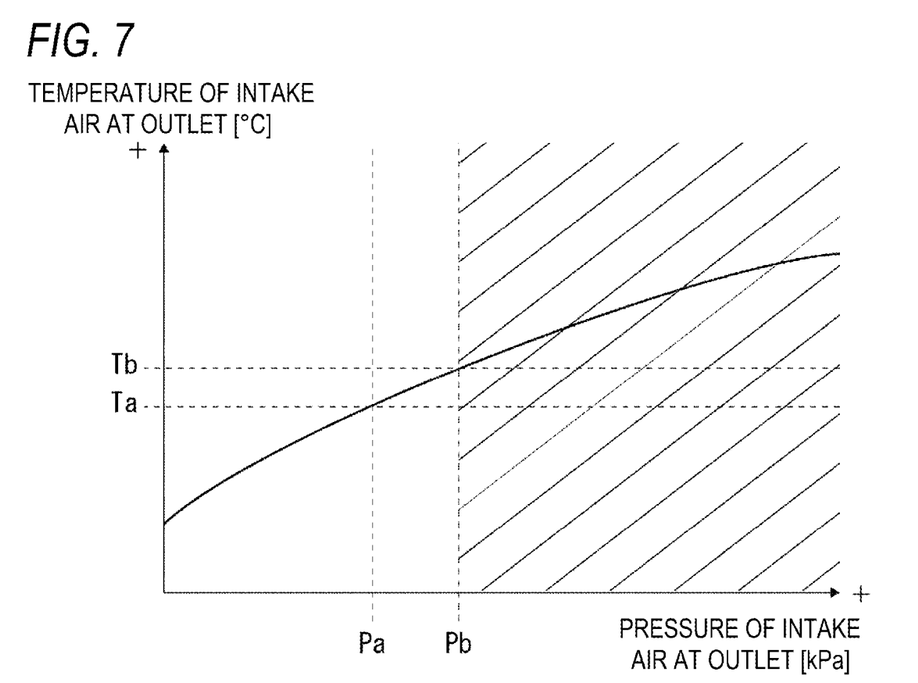
FIG. 7 is a correlation diagram illustrating a correlation between the pressure and the temperature of the intake air at the outlet of the compressor in FIG. 5.

As illustrated in FIG. 7, the shaded portion in the drawing indicates that the operation state of the internal combustion engine 1 is the large flow rate state. In FIG. 7, it is assumed that the variable blades 24 are fully open and the wastegate valve 25 is fully closed.

When the operation state of the internal combustion engine 1 is the large flow rate state, the control device 28 fully opens the variable blades 24 and adjusts the opening degree of the wastegate valve 25 according to the control value based on the differential pressure ΔP. If the target pressure is set to the upper limit pressure Pb, the wastegate valve 25 is fully closed until the pressure Px of the intake air at the outlet of the compressor 22 reaches the upper limit pressure Pb, and comes to an opening degree on the fully open side from fully closed when the pressure Px of the intake air becomes equal to or higher than the upper limit pressure Pb.

The flow rate adjustment valve 32 is interlocked with the movement of the wastegate valve 25, and is fully closed until the pressure Px of the intake air reaches the upper limit pressure Pb and comes to an opening degree on the fully open side from fully closed when the pressure Px of the intake air becomes equal to or higher than the upper limit pressure Pb. Accordingly, the flow rate of the cooling water flowing inside the compressor 22 reduces when the temperature Tx of the intake air at the outlet of the compressor 22 is lower than the upper limit temperature Tb of the cooling water.

As illustrated in FIG. 8, the cooling mechanism 10 of the third embodiment is different from the first embodiment and the second embodiment in that the control device 28 controls the flow rate adjustment valve 32.

The control device 28 has either the lower limit pressure Pa corresponding to the lower limit temperature Ta or the upper limit pressure Pb corresponding to the upper limit temperature Tb illustrated in FIG. 4 or FIG. 7 as the pressure threshold. The control device 28 determines whether the pressure Px acquired by the pressure sensor 29 is lower than the pressure threshold. Next, the control device 28 performs control to reduce the flow rate of the cooling water inside the compressor 22 by the flow rate adjustment valve 32 when the control device 28 determines that the pressure Px is lower than the pressure threshold, and to return from a state in which the flow rate of the cooling water inside the compressor 22 is small by the flow rate adjustment valve 32 when the control device 28 determines that the pressure Px is equal to or higher than the pressure threshold. Accordingly, the flow rate of the cooling water flowing inside the compressor 22 reduces when the temperature Tx of the intake air at the outlet of the compressor 22 is lower than the upper limit temperature Tb of the cooling water.

As described above, the cooling mechanism 10 of the present disclosure has a structure in which the compressor 22 is cooled by the cooling water, and reduces the flow rate of the cooling water flowing inside the compressor 22 when the temperature Tx of the intake air at the outlet of the compressor 22 is lower than the upper limit temperature Tb of the cooling water. Therefore, according to the cooling mechanism 10, it is possible to prevent the volume of the intake air from expanding as the temperature Tx of the intake air rises due to the cooling water. This is advantageous for ensuring the amount of air introduced into the cylinder 2, and can avoid deterioration of the fuel efficiency.

The flow rate adjustment valve 32 of the cooling mechanism 10 of the present disclosure may be mechanically interlocked with the drive devices 27a and 27b of the variable blades 24 and the wastegate valve 25 as in the first embodiment and the second embodiment, or may be controlled by the control device 28 based on the pressure Px of the intake air at the outlet of the compressor 22 as in the third embodiment. Further, the flow rate adjustment valve 32 may be controlled by the control device 28 in a manner interlocked with the variable blades 24 or the wastegate valve 25 using the correlation between the differential pressure ΔP and the control value illustrated in FIG. 2.

As in the first embodiment and the second embodiment, the flow rate adjustment valve 32 is mechanically coupled to the drive devices 27a and 27b and directly linked to the driving of the variable blades 24 or the wastegate valve 25.

If the flow rate adjustment valve 32 is mechanically coupled to the drive device 27a, the small flow rate state in which the variable blades 24 are driven to an opening degree on the fully closed side from fully open is preferably a state in which the temperature Tx of the intake air at the outlet of the compressor 22 is lower than the upper limit temperature Tb of the cooling water, but may be a state in a narrower range. For example, the small flow rate state may be a state in which the temperature Tx is lower than a temperature near the lower limit temperature Ta. If the flow rate adjustment valve 32 is mechanically coupled to the drive device 27b, the large flow rate state in which the wastegate valve 25 is driven to an opening degree on the fully open side from fully closed is preferably a state in which the temperature Tx of the intake air at the outlet of the compressor 22 becomes equal to or higher than the upper limit temperature Tb of the cooling water, but may include a state in a wider range. For example, the large flow rate state may be a state in which the temperature Tx becomes equal to or higher than a temperature near the lower limit temperature Ta.

The cooling mechanism 10 of the present disclosure is configured such that the bearing cooling path 31 branches from the compressor cooling path 30. This is advantageous for avoiding the reduction in the flow rate of the cooling water flowing through the bearing cooling path 31 even if the flow rate of the cooling water flowing through the compressor 22 is reduced. The cooling mechanism of the present disclosure may be configured such that the bearing cooling path 31 is omitted and the cooling flow path inside the compressor 22 and the cooling flow path inside the bearing 23 communicate with each other.

The cooling mechanism 10 of the present disclosure may be configured such that the wastegate valve 25 and the turbine bypass path 4a are omitted in the first embodiment, may be configured such that the variable blades 24 is omitted in the second embodiment, or may be configured such that the variable blades 24, the wastegate valve 25, and the turbine bypass path 4a are omitted in the third embodiment.

In the cooling mechanism 10 of the present disclosure, the flow rate adjustment valve 32 may be configured with an on-off valve having only the two states including fully open and fully closed. In the case of interlocking with the variable blades 24, the flow rate adjustment valve 32 configured with the on-off valve is fully closed until the variable blades 24 become fully open, and is fully open when the variable blades 24 become fully open. Further, in the case of being interlocked with the wastegate valve 25, the flow rate adjustment valve 32 configured with an on-off valve is fully closed until the wastegate valve 25 is opened to the fully open side from fully closed, and is fully open when the wastegate valve 25 starts to be opened to the fully open side from fully closed.

The present application is based on the Japanese patent application filed on Mar. 8, 2021 (Japanese Patent Application No. 2021-035993), and the contents thereof are incorporated herein by reference.

INDUSTRIAL APPLICABILITY

The cooling mechanism according to the present disclosure can prevent deterioration of the fuel efficiency in a structure in which a compressor is cooled by cooling water of an internal combustion engine, and thus is useful in that the fuel efficiency of the vehicle can be improved.

REFERENCE SIGNS LIST

1 internal combustion engine
10 cooling mechanism
11 cooling circuit
20 turbocharger
21 turbine
22 compressor
23 bearing
24 variable blade
25 wastegate valve
30 compressor cooling path
31 bearing cooling path
32 flow rate adjustment valve
33, 34 link member

The invention claimed is:

1. A cooling mechanism comprising:
a cooling circuit of an internal combustion engine;
a compressor cooling path branched from the cooling circuit and joined to the cooling circuit after passing through an inside of a compressor that supercharges intake air of the internal combustion engine,
wherein the compressor is configured to be driven in a manner interlocked with a turbine driven by exhaust gas,
wherein the cooling mechanism comprises a flow rate adjustment valve configured to control a flow rate of cooling water flowing inside the compressor,
wherein the flow rate adjustment valve is configured to make the flow rate of the cooling water flowing inside the compressor when a temperature of intake air at an outlet of the compressor is lower than a temperature of the cooling water lower than the flow rate of the cooling water flowing inside the compressor when the temperature of the intake air at the outlet of the compressor becomes equal to or higher than the temperature of the cooling water,
wherein the turbine includes a variable blade configured to adjust a pressure of the intake air at the outlet of the compressor,
wherein an opening degree of the variable blade at which the temperature of the intake air at the outlet of the compressor is lower than the temperature of the cooling water is an opening degree on a fully closed side from fully open, and
wherein the flow rate adjustment valve comes to an opening degree closer on the fully closed side from fully open in a manner interlocked with the variable blade; and
a link member that mechanically couples the flow rate adjustment valve and a drive device of the variable blade.

2. The cooling mechanism according to claim 1, wherein the turbine includes a wastegate valve configured to adjust a pressure of the intake air at the outlet of the compressor,
wherein an opening degree of the wastegate valve at which the temperature of the intake air at the outlet of the compressor is lower than the temperature of the cooling water is the opening degree on the fully closed side from fully open, and
wherein the flow rate adjustment valve comes to the opening degree closer on the fully closed side from fully open in a manner interlocked with the wastegate valve.

3. The cooling mechanism according to claim 2, further comprising:
a link member that mechanically couples the flow rate adjustment valve and a drive device of the wastegate valve.

4. The cooling mechanism according to claim 1, further comprising:
a pressure acquiring device configured to acquire a pressure of the intake air at the outlet of the compressor; and
a control device configured to control the flow rate adjustment valve,
wherein the control device is configured to perform control to make, by the flow rate adjustment valve, the flow rate of the cooling water flowing inside the compressor when the pressure of the intake air at the outlet acquired by the pressure acquiring device is lower than a pressure threshold lower than the flow rate of the cooling water flowing inside the compressor when the pressure of the intake air at the outlet becomes equal to or higher than the pressure threshold, the pressure threshold being set to enable determination of a state in which the temperature of the intake air at the outlet of the compressor is lower than the temperature of the cooling water.

5. The cooling mechanism according to claim 1, further comprising:
a bearing cooling path branched from the compressor cooling path and joined to the compressor cooling path after passing through an inside of a bearing of the compressor,
wherein the flow rate adjustment valve is arranged in a branch of the compressor cooling path and the bearing cooling path, or in the compressor cooling path downstream of the branch in relation to a flow of the cooling water.

* * * * *